July 22, 1924.
J. NEUMANN
T-SQUARE
Filed Aug. 20, 1923
1,502,396
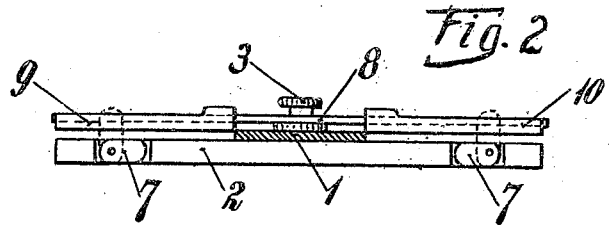
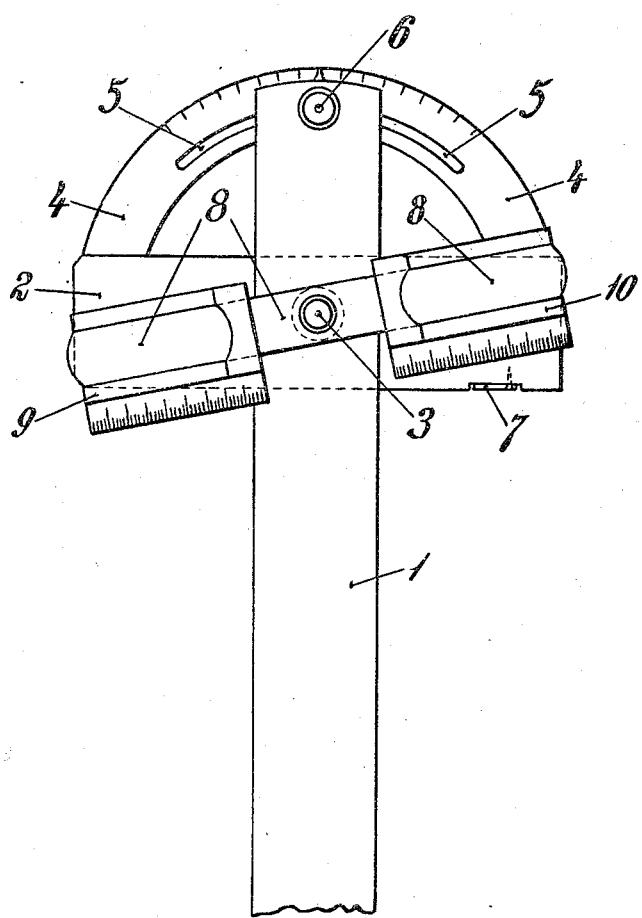
Inventor:
Jan Neumann Patented July 22, 1924.

1,502,396

UNITED STATES PATENT OFFICE.

JAN NEUMANN, OF KROMERIZ, CZECHOSLOVAKIA.

T-SQUARE.

Application filed August 20, 1923. Serial No. 658,469.

To all whom it may concern:

Be it known that I, JAN NEUMANN, a citizen of the Czechoslovakian Republic, residing at Kromeriz, Czechoslovakia, have invented certain new and useful Improvements in T-Squares, of which the following is a specification.

This invention relates to a T square having means for setting the blade at different angles relative to the head, and consists essentially in the provision of two tongues which are let into the guide edge of the head and pivoted so that they can be turned up for extending the guide surfaces to the opposite side of the plane of the blade. This arrangement has the advantage that the square can be used on both sides and allow of drawing oblique parallel lines in two directions with one setting of the blade.

The square is also provided with a supplementary blade which can be adjusted along the principal blade for drawing and measuring lines at right angles to the latter.

Fig. 1 of the accompanying drawings represents a plan of the device, and

Fig. 2, a cross-section of the same.

The blade 1 is connected to the head 2 so that it can be adjusted about a clamp screw 3 and set in different angular positions. An additional clamp screw 6 is fitted in an extension of the blade for securing the latter to a segment 4. This segment has a protractor scale relative to which the blade can be set. The screw 6 passes through a slot 5 in the segment.

According to the invention two tongues 7 are fitted into the head 2 flush with the guide edge of the latter and pivoted so that they can be turned up, as shown by dotted lines in Fig. 2, for extending the guide surface to the opposite side of the plane of the blade 1. Set in this position, therefore, the tongues will abut against the edge of the drawing board and guide the square when the latter is turned onto the reversed side. This arrangement has the advantage that oblique parallel lines, for instance such as used in sectional shading, can be drawn in both directions by a mere reversal of the T square and with a single setting of the blade relative to the head.

The T square has moreover a supplementary blade 8 along which two graduated slides 9 and 10 can be adjusted. This blade has an aperture by means of which it is normally held on the screw 3 whence it can be removed for use on the principal blade 1 for drawing and measuring lines at right angles to the latter. For this purpose the blade 8 is placed across the blade 1, and the two slides are closed up so as to bear against the edges of the same and maintain the two blades at right angles to one another while allowing the blade 8 to be slid into any position along the blade 1.

I claim:

A T square comprising a head and a principal blade, a screw holding the two elements together so that they can be set at different angles relative to one another, a supplementary blade, and two graduated slides fitted on said supplementary blade so that they can be used for guiding the latter along the principal blade and maintain the supplementary blade at right angles thereto, the principal blade being formed with an aperture whereby it can be normally connected to said screw.

JAN NEUMANN.